United States Patent [19]

Ogihara et al.

[11] 4,032,592
[45] June 28, 1977

[54] METHOD FOR THE PREPARATION OF A MODIFIED CRYSTALLINE PROPYLENE POLYMER

[75] Inventors: Sadahide Ogihara, Fujisawa; Yoichi Nakamura, Yono; Osamu Fukui, Toyonaka, all of Japan

[73] Assignee: UBE Industries, Ltd., Ube, Japan

[22] Filed: Feb. 27, 1975

[21] Appl. No.: 553,439

[30] Foreign Application Priority Data

Mar. 15, 1974  Japan .............................. 49-29193

[52] U.S. Cl. ........................... 260/827; 260/837 R; 260/877; 260/878 R; 260/878 B
[51] Int. Cl.$^2$ ...................................... C08F 255/04
[58] Field of Search ..................................... 260/827

[56] References Cited

UNITED STATES PATENTS 3,699,186   10/1972   Schrage et al. ..................... 260/827

*Primary Examiner*—Wilbert J. Briggs, Sr.

[57] ABSTRACT

A method for the preparation of a modified crystalline propylene polymer usable as a bonding material is disclosed, in which method a crystalline propylene polymer, for example, isotactic polypropylene and a propylene-ethylene block or random copolymer, is uniformly admixed with a modifying composition consisting of at least one organic peroxide, and a modifying agent consisting of γ-methacryloyloxypropyl trimethoxysilane (Component (1)) and at least one ethylenically unsaturated organic compound (Component (2)) selected from the groups consisting of the formulae (I) through (V):

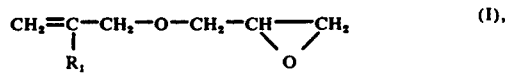

(I),

-continued

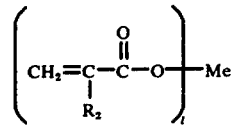
(II),

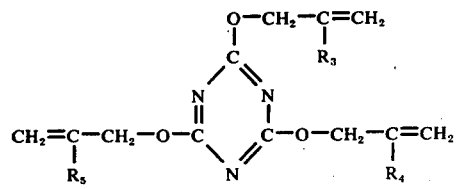
(III),

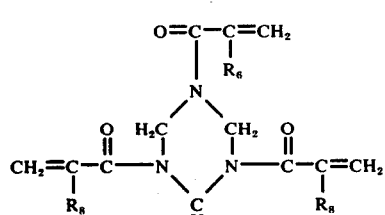
(IV), or

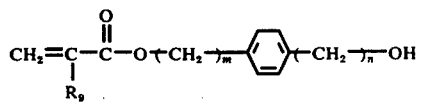
(V)

wherein $R_1$ through $R_9$ respectively represent a hydrogen atom or methyl radical, Me represents a metal atom in Groups I, II, III or VIII in the Periodic Table, l represents an integer corresponding to the valence of the metal atom Me, and m and n each represent 0 or 1, and heating the above admixture at a temperature lower than the thermal decomposing point but not lower than the melting point of said crystalline propylene polymer.

24 Claims, 3 Drawing Figures

METHOD FOR THE PREPARATION OF A MODIFIED CRYSTALLINE PROPYLENE POLYMER

The present invention relates to a method for the preparation of a modified crystalline propylene polymer, more particularly, a modified crystalline propylene polymer usable as a bonding material capable of bonding various articles made of metals, for example, aluminum, copper, iron, steel or zinc, paper, synthetic resins, glass and ceramics to each other.

It is well-known that crystalline propylene polymers, for example, isotactic polypropylene and isotactic propyleneethylene copolymers, have various valuable industrial uses, because of their excellent chemical, physical and electrical properties. However, it is also well-known that propylene polymers are excluded from use as bonding materials on account of their poor bonding properties due to the non-polarity of the propylene polymer molecules.

An object of the present invention is to provide a method for the preparation of a modified crystalline propylene polymer usable as a bonding material.

An other object of the present invention is to provide a method for the preparation of a modified crystalline propylene polymer having excellent bonding properties as well as chemical, physical and electrical properties similar to those of non-modified crystalline propylene polymers.

According to the present invention, the above-mentioned objects can be accomplished by preparation of a modified crystalline propylene polymer usable as a bonding material, which method comprises the steps of uniformly admixing a crystalline propylene polymer with a modifying composition consisting of at least one organic peroxide, and a modifying agent consisting of γ-methacryloyloxypropyltrimethoxysilane and at least one ethylenically unsaturated organic group consisting of selected from the compounds of the formulae (I) through (V):

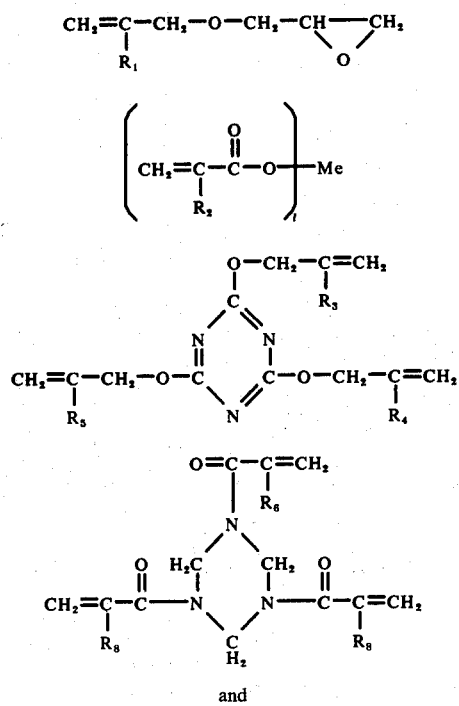

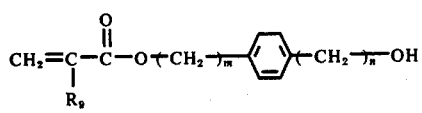

wherein $R_1$ through $R_9$ respectively represent a hydrogen atom or methyl radical, Me represents a metal atom in Groups I, II, III or VIII in the Periodic Table, γ represents an integer corresponding to the valence of the metal atom Me, and m and n each represent 0 or 1, and heating the above admixture at a temperature lower than the thermal decomposing point but not lower than the melting point of said crystalline propylene polymer.

The modified crystalline propylene polymer produced by the method of the present invention has excellent bonding properties previously unattainable in ordinary crystalline propylene polymers.

The features and advantages of the present invention will become more apparent upon reading the detailed description set forth hereinbelow and referring to the accompanying drawings, in which.

Figure 1:
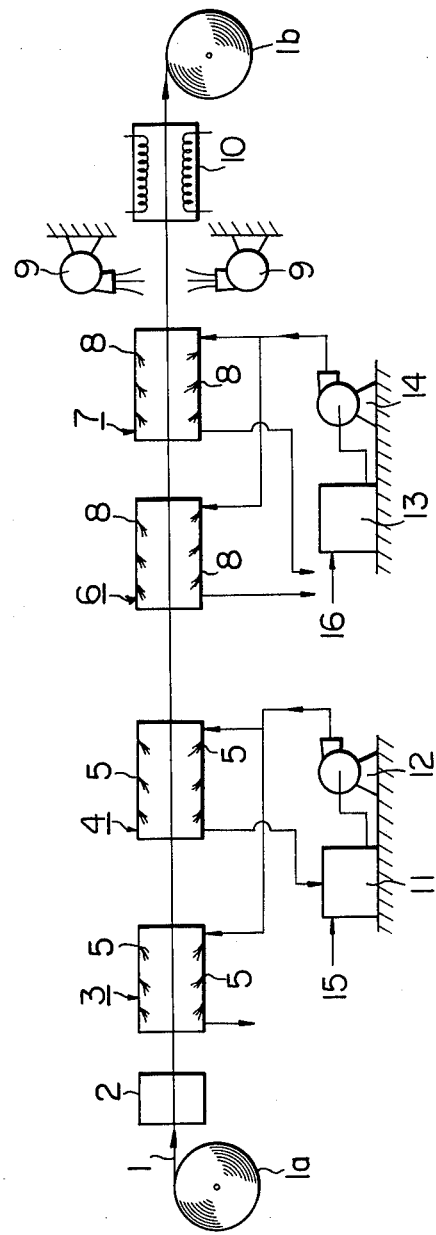
FIG. 1 is a schematic view of an apparatus for continuously degreasing aluminum, copper, zinc or iron plates to be bonded with the modified propylene polymer of the present invention.

The crystalline propylene polymer usable for the method of the present invention may be selected from the group consisting of isotactic polypropylene, random or block co-polymers of at most 30% by weight of at least one α-olefin other than propylene and a balance of propylene, mixtures of at most 30% by weight of at least one polymer of an α-olefin other than propylene and a balance of isotactic polypropylene and a mixture of two or more of the above-mentioned polymers and mixtures. The above-mentioned α-olefin other than propylene may be either ethylene or butene-1.

It is particularly preferable that the crystalline propylene polymer be selected from the group consisting of random and block copolymers of 2 to 15% by weight of ethylene and the balance of propylene and mixtures of 80% by weight or more of the above-mentioned random or block copolymer and a balance of a high density polyethylene. It is desirable that the crystalline propylene polymer used in the method of the present invention should not contain any additive which may be decomposed by the organic peroxide or heat and produce an undesirable color or odour when the polymer is heated to a temperature higher than its melting point.

The modifying agent usable for the method of the present invention consists of γ-methacryloyloxypropyl trimethoxysilane (Component (1)) of the formula:

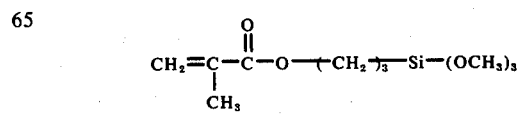

and at least one ethylenically unsaturated organic compound (Component (2)) selected from compounds of the formulae (I), (II), (III), (IV) and (V) which are indicated hereinbefore.

The compound of the formula (I) may be either allyl glycidyl ether or 2-methylallyl glycidyl ether.

In compounds of the formula (II), the metal atom Me may be selected from the group consisting of Na, K, Cu, Mg, Ca, Ba, Zn, Al, Fe, Co and Ni. Particularly, the compound of formula (II) usable for the method of the present invention may be selected from the group consisting of acrylic and methacrylic salts of Na, Ca, Mg, Zn, Al and Fe (III), that is, sodium acrylate, sodium methacrylate, calcium acrylate, calcium methacrylate, magnesium acrylate, magnesium methacrylate, zinc acrylate, zinc methacrylate, aluminum acrylate, aluminum methacrylate, ferric acrylate and ferric methacrylate.

The compound of the formula (III) may be either tri(allyloxy)-s-triazine or tri(2-methylallyloxy)-s-triazine.

The compound of the formula (IV) may be either 1,3,5-triacryloyl hexahydro-s-triazine or 1,3,5-trimethacryloyl hexahydro-s-triazine.

The compound of the formula (V) may be selected from the group consisting of 4-acryloyloxyphenol, 4-(acryloyloxymethyl) phenol, 4-acryloyloxybenzyl alcohol, 4-methacryloyloxyphenol, 4-(methacryloyloxymethyl) phenol, 4-methacryloyloxybenzyl alcohol, and 4-(methacryloyloxymethyl) benzyl alcohol.

The above compounds of formulae (I) through (V) may be used alone or as a mixture of two or more of the above compounds.

In the modifying agent usable for the method of the present invention, it is preferable that the mixing ratio of the weight of the compound of the formula (I), (II), (III), (IV) or (V) (Component (2)) to that of γ-methacryloyloxypropyl trimethoxysilane (Component (1)) should be in a range from 0.1:1 to 10.0:1. If component (1) is mixed with component (2) in a ratio outside the above-mentioned range, the resultant modifying agent causes the formation of a modified propylene polymer having poor bonding properties.

Also, it is preferable that the modifying agent should be used in an amount of 0.1 to 7%, preferably from 0.5 to 5%, based on the weight of the crystalline propylene polymer to be modified.

The organic peroxide usable for the method of the present invention is selected from peroxide compounds having a one minute half-life temperature of about 160° to 240° C. The term "one minute half-life temperature" used herein refers to the temperature at which the half-life period of the peroxide is one minute. The organic peroxide may be selected from the group consisting of tertbutyl peroxyisopropyl carbonate, di-tert-butyl di-peroxyphthalate, tert-butyl peroxyacetate, 2,5-dimethyl-2, 5-di(benzoylperoxy) hexene-3, tert-butyl peroxylaurate, tert-butyl peroxymaleic acid, tert-butyl peroxybenzoate, methylethylketone peroxide, dicumyl peroxide, cyclohexanone peroxide, tert-butylcumyl peroxide and mixtures of two or more of the above-mentioned peroxide compounds. The amount of the organic peroxide to be mixed with the modifying agent is determined in response to the type of organic peroside, the type of modifying, the melt flow index of the crystalline propylene polymer to be modified and the desired melt flow index of the modified crystalline propylene polymer to be prepared. Generally, the organic peroxide is used in an amount of 0.1 to 5%, preferably from 0.25 to 3.0% based on the weight of the crystalline propylene polymer to be modified. It is preferable that the organic peroxide should decompose completely during the preparation of the modified propylene polymer at a temperature not lower than the melting point of the crystalline propylene polymer. This is important in preventing the decomposition of the modified propylene polymer and the additive therein, for example, a fresh crystalline propylene polymer, an anti-oxidant or pigment, during the bonding period. It is preferable that, in the modifying composition, the organic peroxide be present in an amount of about 5 to 80% based on the weight of the modifying agent.

If the modifying agent and the organic peroxide respectively are present in amounts smaller than the lower limits defined above, the crystalline propylene polymer will be insufficiently modified and, therefore, the resulting modified crystalline propylene polymer will have poor bonding properties.

On the other hand, even if the amounts of the modifying agent and the organic peroxide respectively are larger than the upper limits as defined hereinbefore, there will be no corresponding increase in the bonding strength of the modified propylene polymer. Further, an excessive amount of modifying agent results in the formation, in the resultant modified propylene polymer, of a gel consisting of an interpolymer of the modifying agent itself. This gel causes a reduction in the bonding strength of the modified propylene polymer. Also, an excessive amount of organic peroxide results in an excessively large melt flow index of the modified propylene polymer. Such a large melt flow index creates difficulties in melt-shaping the modified propylene polymer.

The modifying composition is uniformly admixed with the crystalline propylene polymer in a conventional admixing apparatus, for example, a rotary mixer or blender. The admixture is heated to a temperature lower than the thermal decomposing point, that is, between approximately 270° and 340° C but not lower than the melting point of the crystalline propylene polymer, that is, between approximately 140° and 170° C, in order to modify the crystalline propylene polymer with the modifying composition. The modification is preferably carried out at a temperature of 180° to 250° C over a period of time sufficient for adequately modifying the propylene polymer. In the simplest procedure, the admixture is charged into an extruder, heated at the above-mentioned temperature to melt the admixture, and the melt is then extruded through a die. The extruded melt is solidified by cooling. If the temperature of the admixture during the modification period is lower than the melting point or higher than the thermal decomposing point of the crystalline propylene polymer to be modified, the resultant modified propylene polymer has excessively low bonding properties.

The modified crystalline propylene polymer prepared by the method of the present invention has a preferable melt flow index of 120 or less and may be mixed with small amount of conventional additives for example, anti oxidants, plasticizers, antistatic agents or coloring matter. If it is difficult to shape the modified crystalline propylene polymer in the desired fashion due to an excessively high melt flow index, for example, one above 120°, the modified crystalline propylene polymer may be mixed with a non-modified crystalline propylene polymer in an amount of 50% or less, based on the weight of the modified polymer, in order to reduce its melt flow index. The modified crystalline propylene polymer may be finely divided by a mechanical apparatus, for example, a crusher and grinder, to form a power, or it may be formed into a thin film by a film-forming apparatus, for example an extruder with a T-die or a blown film-forming apparatus. The modified crystalline propylene polymer powder or film has an excellent capacity for bonding various articles made of, for example, a metal, (for instance, aluminum, copper, zinc, lead, nickel, iron, stainless steel, carbon steel and alloys containing one or more of the above-mentioned metals;) paper; synthetic resins; glass; slate; plywood; leather; fabric; and ceramic material. Accordingly, the modified crystalline propylene polymer can be used as a bonding material in the form of a powder or a film for the above-mentioned articles or deposited under vacuum conditions on the shaped article.

Generally, commercial metal plates can be employed for the process of the present invention. The surface of the commercial metal plates are usually stained with grease or oily substances. Accordingly, it is preferable that the surfaces of the commercial metal plates to be bonded by the bonding material of the present invention be preliminarily degreased and cleaned. Said degreasing can be carried out in accordance with any conventional method. For example, the degreasing may be continuously effected by using the apparatus shown in FIGS. 1 or 2.

Referring to FIG. 1, a metal plate 1 consisting of aluminum, copper, zinc, lead, nickel, iron or steel is continuously fed from a roll 1a to a pre-washing stage 3 and a main washing stage 4. During the period of the plate 1 passing through washing stages 3 and 4, both the upper and lower surfaces of plate 1 are washed with a washing liquid ejected thereto from nozzles 5 located above and beneath the travel path of the plate 1. As is shown in FIG. 1, these nozzles 5 are positioned at an angle of about 30° with respect to the direction in which the plate is fed. The washing liquid consists of, for example, an aqueous solution of 0.5 to 5% by weight of a composition of 43 to 67% by weight of sodium metasilicate, 15 to 25% by weight of sodium tertiary phosphate, 15 to 25% by weight of sodium tripolyphosphate, 3 to 7% of a nonionic surface active agent, for example, an oleyl polyoxyethylene ether wherein the polyoxyethylene moiety consists of 20 to 30 ethylene oxide units. The washing liquid is maintained at a temperature of 30° to 80° C and stored in a washing liquid vessel 11. The washing liquid in the vessel 11 is supplied to the nozzle 5 by means of a pump 12. Waste washing liquid in the main washing stage 4 is recycled to vessel 11, whereas waste washing liquid in the pre-washing stage 3 is discharged at stage 3. An amount of fresh washing liquid equal to the amount of waste washing liquid discharged at stage 3 is supplied to the vessel 11 through a supply conduit 15.

After passing through the main washing stage 4, the metal plate 1 is fed into a pre-water-rinsing stage 6 and a main water-rinsing stage 7. Within stages 6 and 7, the plate is rinsed with water ejected thereto from nozzles 8, in the same manner as mentioned above. The rinsing water is supplied into a vessel 13 through a water supply conduit 16 and maintained therein at a temperature between room temperature and 80° C. The rinsing water is fed from vessel 13 to nozzle 8 by means of a pump 14. The waste rinsing water is discharged at rinsing stages 6 and 7.

After the water-rinsing is completed, the water on the two surfaces of the plate 1 is blown or evaporated off by an air jet generated by a pair of blowers 9, and plate 1 is dried completely in a drying chamber 10. The dried plate 1 is then rolled up into a roll 1b.

If plate 1 has rust formed on the surfaces thereof, it is preferable that the plate be fed into a rust-removing stage 2 located prior to the pre-washing stage 3. In the rust-removing stage 2, the rust on the metal plate 1 is mechanically removed by means of sand brushing.

Figure 2:
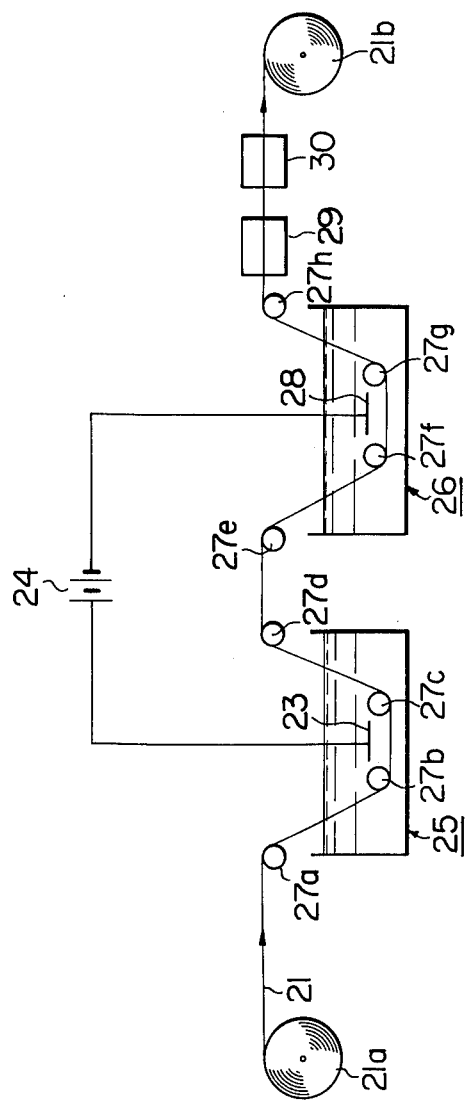
FIG. 2 is a schematic view of a continuous apparatus for degreasing stainless steel plates to be bonded with the modified propylene polymer of the present invention.

If stainless steel plates are bonded by the bonding material of the present invention, it is preferable that the stainless plates be degreased by an electrolytic cleaning method using an apparatus such as that shown in FIG. 2, because the apparatus of FIG. 1 is unsatisfactory for the complete degreasing of the stainless steel plates.

Referring to FIG. 2, a stainless steel plate 21 is drawn off from a roll 21a and fed into a cleaning apparatus composed of a first electrolytic cleaning vessel 25, a second electrolytic cleaning vessel 26, a water-rinsing stage 29 and a drying stage 20 which are successively located along the travel path of the plate 21. The first and second vessels 25 and 26 respectively include therein an electrolytic solution consisting of a 3 through 5% aqueous solution of a composition containing 47 to 53% by weight of sodium metasilicate, 27 to 35% by weight of sodium carbonate, 5 to 10% by weight of sodium tertiary phosphate and 2 to 21% by weight of a non-ionic surface active agent, for example, oleyl polyoxyethylene ether in which the polyoxyethylene moiety consists of 20 to 30 ethylene oxide units polymerized. The electrolytic solution is maintained at a temperature of 60° to 80° C. An anode plate 23 is placed in the electrolyte solution in the first vessel 25 in such a manner that the anode plate 23 faces the plate 21 travelling through the first vessel 25. The anode plate 23 is electrically connected to an electric source 24. A cathode plate 28 is placed in the electrolytic solution in the second vessel 26, in the same manner as that of the anode 23, and electrically connected to the electric source 24. The plate 21, drawn off from the roll 21a, is fed to the first vessel 25 through a guide roller 27a, travels through the first vessel 25 by the guidance of rollers 27b and 27c and, then, is drawn off therefrom by the guidance of a roller 27d. Thereafter, the plate 21 is fed into the second vessel 26 through a guide roller 27e, travels therethrough by the guidance of rollers 27f and 27g and, then, is withdrawn therefrom by the guidance of a roller 27h. During the travelling period of the plate 21 in the first and second vessel 25 and 26, a direct current flows between the anode 23 or cathode 28 and the plate 21 in a current density of 300 to 1,000 ampere/m$^2$. The travelling velocity of the plate 21 is adjusted in such a manner that plate 21 remains in the first and second vessels 25 and 26, wherein it is subjected to electrolytic cleaning, for a total of 15 to 60 seconds. The current density between the anode 23 or cathode 28 and the plate 21 can be changed by varying the distance therebetween.

Plate 21, cleaned as mentioned above, is fed into the water-rinsing stage 29 to remove the electrolyte solution therefrom and then into the drying stage 30 where the plate 21 is dried completely. The dried plate 21 is rolled up into a roll 21b. The stainless steel plate 21, cleaned and dried as mentioned above, is in a suitable condition for being firmly and continuously bonded with the bonding material of the present invention.

In order to produce a composite plate composed of two or more metal plates bonded to each other by the bonding material of the present invention, the powder or film of the modified crystalline propylene polymer is interposed, preferably, in an amount of 0.003 to 0.02g/cm², between the metal plates, and the precursory composite plate thus formed is heated and pressed by a heat-pressing machine, for example, a compression molding machine and roll pressing machine, at a temperature of between 170° and 240° C, preferably from 190° to 220° C, under a pressure of about 3 to 100kg/cm² for a period ranging from 0.1 seconds to 5 minutes.

Figure 3:
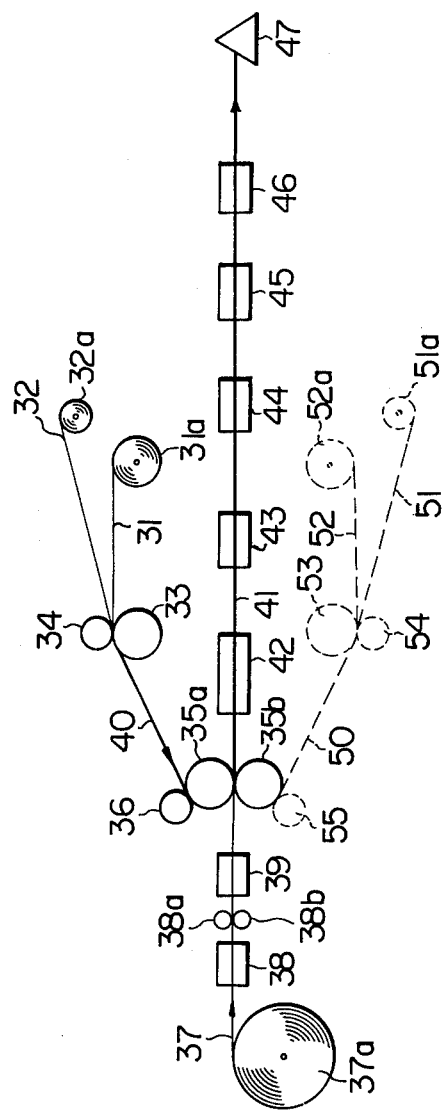
FIG. 3 is a schematic view of a continuous apparatus for producing a composite plate by using the modified propylene polymer of the present invention.

The composite plate composed of two or more metal plates bonded to each other by the modified propylene polymer bonding material may be continuously produced by, for example, an apparatus such as is shown in FIG. 3.

Referring to FIG. 3, a metal plate 31 which has been degreased, is drawn off from a roll 31a and a film 32 consisting of the modified propylene polymer of the present invention is drawn off from a roll 32a. The film 32 and the plate 31 are fed to a pair of nip rollers 33 and 34 so that the film 32 and the plate 31 are superimposed on each other. The lower roller 33 of the nip rollers is a heating roller to heat metal plate 31 to a temperature of 130° to 160° C. Metal plate 31 may be heated by a heating device located prior to nip rollers 33 and 34 in place of the heating roller 33.

Plate 31 and film 32 are brought into close contact with each other by the nip rollers 33 and 34 without an air layer forming therebetween, and are bonded to each other. After passing through the nip rollers 33 and 34, the plate 31 and film 32 are converted to a provisional composite plate 40.

The other metal plate 37 which has been completely degreased, is drawn off separately from a roll 37a and fed into a leveller 38 where deformations created within the plate 37 are eliminated. The plate 37 is then fed to a pre-heated 39 through a pair of nip rollers 38a and 38b, and pre-heated to a temperature of between 180° and 250° C. The provisional composite plate 40 is fed to a pair of nip rollers 35a and 35b by means of a roller 36 which rotates together with the upper roller 35a. The preheated plate 37 is also fed to the nip rollers 35a and 35b and pressed together with the provisional composite plate 40. The resultant composite plate 41 is composed of the plate 31 and the plate 37 bonded to each other by the film 32. The composite plate 41 is further pressed and heated in a heat-pressing stage 42 at a temperature of 170° to 240° C under a pressure of 3 to 100 kg/cm² for a period between 0.1 seconds and 5 minutes. In the first cooling stage 43, the composite plate 41 is cooled to a temperature of about 100° C while being pressed with nip rollers (not shown) so as to prevent deformation of the composite plate 41. Thereafter, the composite plate 41 is cooled to room temperature in a second cooling stage 44. The cooled composite plate 41 is fed into a cutting stage 45 wherein edge portions of the composite plate 41 are cut so as to adjust the composite plate to a desired size. Thereafter, the composite plate 41 is further fed to a leveller 46 to eliminate any deformation created therein. The stress-free composite plate 41 is fed into a finishing stage 47 where the composite plate 41 is rolled up or cut to a desired size.

In order to prepare a five-component composite plate composed of three metal plates bonded by two bonding material layers inserted therebetween, a provisional composite plate 50 is prepared by the same method as used for the provisional composite plate 40 in the apparatus shown by dotted lines in FIG. 3. That is, a metal plate 52 and a bonding film 51 consisting of a modified propylene polymer of the present invention are respectively drawn off from a roll 52a and a roll 51a and bonded to each other by a pair of nip rollers 53 and 54. The resultant provisional composite plate 50 is fed to the nip rollers 35a and 35b through a roller 55 rotating together with the lower roller 35b. Between the nip rollers 35a and 35b, the provisional composite plate 50 is incorporated with the provisional composite plate 40 and the preheated plate 37 in such a manner that the bonding film 51 in the provisional composite plate 50 and the bonding film 32 in the provisional composite plate 40 respectively come into contact with the upper and lower surfaces of the plate 37. The resultant composite plate is processed by the same method as mentioned hereinbefore.

In the preparation of the five-component composite plate mentioned above, the metal plate 37 located in the middle portion of the composite plate may be replaced by a resinous plate, for example, a polypropylene sheet. When this type of the composite plate is produced by the apparatus of FIG. 3, the leveller 38 and the preheater 39 may be omitted from the apparatus.

The features and advantages of the present invention will be further illustrated by the following examples which are given by way of illustration of and not as limitations of, the Scope of the Present Invention. In the examples, all parts and percentages are by weight unless otherwise stated.

In the following examples, the melt flow index (M.I.) was determined in accordance with the method of ASTM D-1238, the resistance of an adhesive to T-peeling was determined in accordance with the T-peel test method of ASTM D-1876, and the resistance to peeling at an angle of 180° was determined in accordance with said test method ASTM D-903.

EXAMPLES 1 THROUGH 9 AND COMPARISON EXAMPLES 1 THROUGH 9

In each of the Examples 1 through 5, 100 parts by weight of an ethylene-propylene block copolymer consisting of 8% by weight of copolymerized ethylene and the balance of copolymerized propylene and having a melt flow index of 1.0 and a melting point of about 160° C, was uniformly mixed with tert-butyl peroxybenzoate (Examples 1 through 5) or 2,5-dimethyl-2,5-di(benzoylperoxy) hexene-3(Examples 6 through 9) and a modifying agent consisting of γ-methacryloyloxypropyl trimethoxysilane (Component (1)) and allyl glycidyl ether (Component (2)), the amounts of which are indicated in Table 1. The mixture was fed into an extruder and melted therein at an average temperature of 220° C for about 5 minutes to modify the block copolymer. The modified block copolymer melt was extruded from the extruder through a die and cut to form pellets of about 2mm in diameter and about 3mm in length. 100 parts of the modified block copolymer pellets were uniformly mixed with 0.1 part of tetrakis [methylene 3-(3,5-di-tert-butyl-4-hydroxyphenyl) propionate] methane. The mixture was supplied to a T-die type film-making apparatus. In the apparatus, the mixture was melted at a temperature of 240° C and the melt extruded through a T-die to form a film, the said film drawn up to an average thickness of 100μ.

Two pieces of commercial aluminum plate (AllOOP H12, made by Nippon Keikinzoku K. K.) of 0.1mm thickness were immersed in trichloroethylene at a temperature of 50° C to remove greasy substances thereon, and then dried at room temperature.

The modified block copolymer film was interposed between the aluminum plates to form a precursory composite plate.

The precursory composite plate was placed on a compression moulding machine, preheated at a temperature of 220° C for about 1 minute and then pressed at the same temperature under a gauge pressure of 10kg/cm² for approximately 4 minutes. After the completion of pressing, the resultant composite plate was cooled with water. The composite plates of Examples 1 through 9 thus produced had resistances to T-peeling as indicated in Table I.

In each of the Comparison Examples 1 through 5, operations identical to those in Example 1 were carried out, except that tert-butyl peroxybenzoate or 2,5-dimethyl-2,5-di (benzoylperoxy) hexene-3 and γ-methacryloyloxypropyl trimethoxysilane were used in an amount indicated in Table 1 and no allyl glycidyl ethel was used.

In each of Comparison Example 6 through 9, the same procedures as in Example 1 were repeated except that no γ-methacryloxyloxypropyl trimethoxysilane was used and tert-butyl peroxybenzoate or 2,5-dimethyl-2,5-di(benzoylperoxy) hexene-3 and allyl glycidyl ether were used in amounts indicated in Table 1.

The resistances to T-peeling of the comparison composite plate are indicated in Table 1.

Table 1

| Example No. | Modifying agent Component (1) (part by weight) | Modifying agent Component (2) (part by weight) | Organic peroxide Type of Compound | Organic peroxide Amount (part by weight) | Resistance to T-peeling (kg/cm) |
|---|---|---|---|---|---|
| 1 | 0.5 | 0.5 | A | 0.5 | 7.5 |
| 2 | 2.5 | 0.5 | A | 0.5 | 7.3 |
| 3 | 1.5 | 1.5 | A | 0.5 | 8.5 |
| 4 | 0.5 | 2.5 | A | 0.5 | 8.3 |
| 5 | 2.5 | 2.5 | A | 0.5 | 8.3 |
| 6 | 0.5 | 0.5 | B | 0.5 | 7.3 |
| 7 | 2.5 | 0.5 | B | 0.5 | 7.6 |
| 8 | 0.5 | 2.5 | B | 0.5 | 7.5 |
| 9 | 2.5 | 2.5 | B | 0.5 | 8.0 |
| Comparison Example 1 | 0.5 | — | A | 0.25 | 4.0 |
| 2 | 1.5 | — | A | 0.5 | 4.1 |
| 3 | 2.5 | — | A | 0.5 | 3.3 |
| 4 | 0.5 | — | B | 0.25 | 3.5 |
| 5 | 2.5 | — | B | 0.5 | 4.0 |
| 6 | — | 0.5 | A | 0.25 | 0.5 |
| 7 | — | 1.5 | A | 0.5 | 0.5 |
| 8 | — | 2.5 | A | 0.5 | 0.5 |
| 9 | — | 0.5 | B | 0.25 | 0.3 |

The above symbols A and B will be also used in the following examples.

EXAMPLES 10 THROUGH 16 AND COMPARISON EXAMPLES 10 THROUGH 14

In each of the Examples 10 through 16, the same procedures as in Example 1 were carried out using tert-butyl peroxybenzoate or 2,5-dimethyl-2,5-di(benzoylperoxy)hexene-3, as the organic peroxide, and a modifying agent consisting of γ-methacryloyloxypropyl trimethoxysilane (Component (1)) and zinc acrylate (Component (2)), the amounts of which are shown in Table 2.

In each of the comparison examples, the same operations as in Example 10 were repeated except that γ-methacryloyloxypropyl trimethoxysilane was not used and the organic proxides and zinc acrylate were employed in the amounts indicated in Table 2.

The resistances to T-peeling of the composite plates of the present invention and the comparative plates are indicated in Table 2.

Table 2

| Example No. | Modifying agent Component (1) (part) | Modifying agent Component (2) (part) | Organic peroxide Type of Compound | Organic peroxide Amount (part) | Resistance to T-peeling (kg/cm) |
|---|---|---|---|---|---|
| 10 | 0.5 | 0.5 | A | 0.5 | 7.8 |
| 11 | 2.5 | 0.5 | A | 0.5 | 8.0 |
| 12 | 1.5 | 1.5 | A | 0.5 | 8.3 |
| 13 | 0.5 | 2.5 | A | 0.5 | 7.9 |
| 14 | 2.5 | 2.5 | A | 0.5 | 8.6 |
| 15 | 0.5 | 0.5 | B | 0.5 | 7.5 |
| 16 | 2.5 | 2.5 | B | 0.5 | 8.2 |
| Comparison Example 10 | — | 0.5 | A | 0.25 | 2.8 |
| 11 | — | 1.5 | A | 0.5 | 3.0 |
| 12 | — | 2.5 | A | 0.5 | 3.8 |
| 13 | — | 0.5 | B | 0.25 | 2.5 |
| 14 | — | 2.5 | B | 0.5 | 3.8 |

EXAMPLES 17 THROUGH 23 AND COMPARISON EXAMPLES 15 THROUGH 19

In each of the Examples 17 through 23, the same operations as in Example 1 were repeated using the same organic peroxide compounds as used in Examples 10 through 16 and a modifying agent consisting of γ-methacryloyloxypropyl trimethoxysilane (Component (1)) and zinc methacrylate (Component (2)), the amounts of which are shown in Table 3.

In each of Comparison Examples 15 through 19, the same procedures as in Examples 17 through 23 were repeated except that no γ-methacryloyloxypropyl trimethoxysilane was used.

The resistances to T-peeling of the composite plates of the above examples and comparison examples are indicated in Table 3.

Table 3

| Example No. | Modifying agent Component (1) (part) | Modifying agent Component (2) (part) | Organic peroxide Type of Compound | Organic peroxide Amount (part) | Resistance to T-peeling (kg/cm) |
|---|---|---|---|---|---|
| 17 | 0.5 | 0.5 | A | 0.5 | 7.5 |
| 18 | 2.5 | 0.5 | A | 0.5 | 8.0 |
| 19 | 1.5 | 1.5 | A | 0.5 | 8.0 |
| 20 | 0.5 | 2.5 | A | 0.5 | 8.2 |
| 21 | 2.5 | 2.5 | A | 0.5 | 8.3 |
| 22 | 0.5 | 0.5 | B | 0.5 | 7.2 |
| 23 | 2.5 | 2.5 | B | 0.5 | 8.1 |
| Comparison Example 15 | — | 0.5 | A | 0.25 | 3.0 |
| 16 | — | 1.5 | A | 0.5 | 3.7 |
| 17 | — | 2.5 | A | 0.5 | 4.2 |
| 18 | — | 0.5 | B | 0.25 | 3.0 |
| 19 | — | 2.5 | B | 0.5 | 3.5 |

EXAMPLES 24 THROUGH 30 AND COMPARISON EXAMPLES 20 THROUGH 24

In each of the Examples 24 through 30, the same operations as in Example 1 were effected using the same organic peroxide compounds as used in Examples 17 through 23 and a modifying agent consisting of γ-methacryloyloxypropyl trimethoxysilane (Component (1)) and Calcium acrylate (Component (2)), the amounts of which are indicated in Table 4.

In the comparison examples, the same procedures as in Examples 24 through 30 were repeated without using γ-methacryloyloxypropyl trimethoxysilane.

The resistances to T-peeling of the composite plates of the above examples and the comparison examples are indicated in Table 4.

Table 4

| | Modifying Composition | | | | |
|---|---|---|---|---|---|
| | Modifying agent | | Organic peroxide | | Resistance to T-peeling (kg/cm) |
| Example No. | Component (1) (part) | Component (2) (part) | Type of Compound | Amount (part) | |
| 24 | 0.5 | 0.5 | A | 0.5 | 6.9 |
| 25 | 1.5 | 1.5 | A | 0.5 | 7.5 |
| 26 | 2.5 | 2.5 | A | 0.5 | 7.5 |
| 27 | 0.5 | 0.5 | B | 0.5 | 6.5 |
| 28 | 2.5 | 0.5 | B | 0.5 | 7.7 |
| 29 | 0.5 | 2.5 | B | 0.5 | 7.3 |
| 30 | 2.5 | 2.5 | B | 0.5 | 7.0 |
| Comparison Example 20 | — | 0.5 | A | 0.25 | 1.5 |
| 21 | — | 1.5 | A | 0.5 | 1.8 |
| 22 | — | 2.5 | A | 0.5 | 1.5 |
| 23 | — | 0.5 | B | 0.25 | 0.8 |
| 24 | — | 2.5 | B | 0.5 | 1.0 |

EXAMPLES 31 THROUGH 37 AND COMPARISON EXAMPLES 25 THROUGH 29

In Examples 31 through 37, the same operations as those in Examples 24 through 30 were carried out using the same organic peroxide compounds as used in Examples 24 through 30 and a modifying agent consisting of γ-methacryloyloxypropyl trimethoxysilane (Component (1)) and aluminum acrylate (Component (2)), the amounts of which are shown in Table 5.

In Comparison Examples 25 through 29, the same procedures as those in Examples 31 through 37 were repeated except that no γ-methacryloyloxypropyl trimethoxysilane was employed.

The resistances to T-peeling of the composite plates of the above examples and the comparative composite plates, are indicated in Table 5.

Table 5

| | Modifying Composition | | | | |
|---|---|---|---|---|---|
| | Modifying agent | | Organic peroxide | | Resistance to T-peeling (kg/cm) |
| Example No. | Component (1) (part) | Component (2) (part) | Type of Compound | Amount (part) | |
| 31 | 0.5 | 0.5 | A | 0.5 | 7.5 |
| 32 | 1.5 | 1.5 | A | 0.5 | 8.1 |
| 33 | 2.5 | 2.5 | A | 0.5 | 8.5 |
| 34 | 0.5 | 0.5 | B | 0.5 | 7.5 |
| 35 | 2.5 | 0.5 | B | 0.5 | 8.0 |
| 36 | 0.5 | 2.5 | B | 0.5 | 7.8 |
| 37 | 2.5 | 2.5 | B | 0.5 | 8.0 |
| Comparison Example 25 | — | 0.5 | A | 0.25 | 3.2 |
| 26 | — | 1.5 | A | 0.5 | 3.5 |
| 27 | — | 2.5 | A | 0.5 | 4.0 |
| 28 | — | 0.5 | B | 0.25 | 3.0 |
| 29 | — | 2.5 | B | 0.5 | 3.5 |

EXAMPLES 38 THROUGH 46 AND COMPARISON EXAMPLES 30 THROUGH 34

In Examples 38 through 46, operations identical to those in Examples 1 through 9 were effected using the same organic peroxide compounds as used in Examples 1 through 9 and a modifying agent consisting of γ-methacryloyloxypropyl trimethoxysilane (Component (1)) and tri(allyloxy)-s-triazine (Component (2)), the amounts of which are shown in Table 6.

In Comparison Examples 30 through 34, the same operations as those in Example 38 through 46 were repeated without using γ-methacryloyloxypropyl trimethoxysilane.

The resistances to T-peeling of the composite plates of the above examples and the comparison examples, are indicated in Table 6.

Table 6

| | Modifying Composition | | | | |
|---|---|---|---|---|---|
| | Modifying agent | | Organic peroxide | | Resistance to T-peeling (kg/cm) |
| Example No. | Component (1) (part) | Component (2) (part) | Type of Compound | Amount (part) | |
| 38 | 0.5 | 0.5 | A | 0.5 | 8.3 |
| 39 | 2.5 | 0.5 | A | 0.5 | 7.8 |
| 40 | 1.5 | 1.5 | A | 0.5 | 8.5 |
| 41 | 0.5 | 2.5 | A | 0.5 | 8.2 |
| 42 | 2.5 | 2.5 | A | 0.5 | 7.9 |
| 43 | 0.5 | 0.5 | B | 0.5 | 7.8 |
| 44 | 2.5 | 0.5 | B | 0.5 | 7.8 |
| 45 | 0.5 | 2.5 | B | 0.5 | 8.1 |
| 46 | 2.5 | 2.5 | B | 0.5 | 8.5 |
| Comparison Example 30 | — | 0.5 | A | 0.25 | 0.1 |
| 31 | — | 1.5 | A | 0.5 | 0.1 |
| 32 | — | 2.5 | A | 0.5 | 0.1 |
| 33 | — | 0.5 | B | 0.25 | 0.1 |
| 34 | — | 2.5 | B | 0.5 | 0.1 |

EXAMPLES 47 THROUGH 55 AND COMPARISON EXAMPLES 35 THROUGH 39

In Examples 47 through 55, the same operations as in Example 1 through 9 are effected using the same organic peroxide as used in Examples 1 through 9 and a modifying agent consisting of γ-methacryloyloxypropyl trimethoxysilane (Component (1)) and 1,3,5-triacryloylhexahydro-s-triazine (Component (2)), the amounts of which are indicated in Table 7.

In Comparison Examples 35 through 39, the same operations as in Examples 47 through 55 were carried out except that no γ-methacryloyloxypropyl trimethoxysilane was used.

The resistances to T-peeling of the composite plates of the above examples and the comparison examples are indicated in Table 7.

Table 5-continued

| | Modifying Composition | | | | |
|---|---|---|---|---|---|
| | Modifying agent | | Organic peroxide | | Resistance to T-peeling (kg/cm) |
| Example No. | Component (1) (part) | Component (2) (part) | Type of Compound | Amount (part) | |
| 29 | — | 2.5 | B | 0.5 | 3.5 |

Table 7

| Example No. | Modifying Composition | | | | Resistance to T-peeling (kg/cm) |
|---|---|---|---|---|---|
| | Modifying agent | | Organic peroxide | | |
| | Component (1) (part) | Component (2) (part) | Type of Compound | Amount (part) | |
| 47 | 0.5 | 0.5 | A | 0.5 | 8.0 |
| 48 | 2.5 | 0.5 | A | 0.5 | 7.5 |
| 49 | 1.5 | 1.5 | A | 0.5 | 7.8 |
| 50 | 0.5 | 2.5 | A | 0.5 | 8.0 |
| 51 | 2.5 | 2.5 | A | 0.5 | 7.5 |
| 52 | 0.5 | 0.5 | B | 0.5 | 7.9 |
| 53 | 2.5 | 0.5 | B | 0.5 | 8.1 |
| 54 | 0.5 | 2.5 | B | 0.5 | 8.3 |
| 55 | 2.5 | 2.5 | B | 0.5 | 8.2 |
| Comparison Example | | | | | |
| 35 | — | 0.5 | A | 0.25 | 0.1 |
| 36 | — | 1.5 | A | 0.5 | 0.1 |
| 37 | — | 2.5 | A | 0.5 | 0.1 |
| 38 | — | 0.5 | B | 0.25 | 0.1 |
| 39 | — | 2.5 | B | 0.5 | 0.1 |

EXAMPLES 56 THROUGH 64 AND COMPARISON EXAMPLES 40 THROUGH 44

In Examples 56 through 64, the same operations as those in Examples 1 through 9 are repeated using the same organic peroxide compounds as used in Examples 1 through 9 and a modifying agent consisting of γ-methacryloyloxypropyl trimethoxysilane (Component (1)) and 4-methacryloyloxyphenol (Component (2)), the amounts of which are indicated in Table 8.

In Comparison Examples 40 through 44, the same operations as those in Examples 56 through 64 were repeated except that no γ-methacryloyloxypropyl trimethoxysilane was used.

The resistances to T-peeling of the composite plates of the above examples and the comparison examples are indicated in Table 8.

Table 8

| Example No. | Modifying Composition | | | | Resistance to T-peeling (kg/cm) |
|---|---|---|---|---|---|
| | Modifying agent | | Organic peroxide | | |
| | Component (1) (part) | Component (2) (part) | Type of Compound | Amount (part) | |
| 56 | 0.5 | 0.5 | A | 0.5 | 7.9 |
| 57 | 2.5 | 0.5 | A | 0.5 | 8.8 |
| 58 | 1.5 | 1.5 | A | 0.5 | 8.5 |
| 59 | 0.5 | 2.5 | A | 0.5 | 8.2 |
| 60 | 2.5 | 2.5 | A | 0.5 | 8.3 |
| 61 | 1.5 | 1.5 | A | 1.0 | 8.0 |
| 62 | 1.5 | 1.5 | B | 0.5 | 7.8 |
| 63 | 2.5 | 0.5 | B | 1.0 | 8.0 |
| 64 | 0.5 | 2.5 | B | 1.0 | 7.9 |
| Comparison Example | | | | | |
| 40 | — | 0.5 | A | 0.25 | 4.8 |
| 41 | — | 1.5 | A | 0.5 | 5.8 |
| 42 | — | 2.5 | A | 0.5 | 5.8 |
| 43 | — | 1.5 | A | 1.0 | 5.3 |
| 44 | — | 1.5 | B | 0.5 | 5.5 |

EXAMPLES 65 THROUGH 73 AND COMPARISON EXAMPLES 45 THROUGH 49

In Examples 65 through 73, the same operations as those of Examples 1 through 9 were carried out using the same organic peroxide compounds as used in Examples 1 through 9 and a modifying agent consisting of γ-methacryloyloxypropyl trimethoxysilane (Component (1)) and 4-(methacryloyloxymethyl)phenol (Component (2)), the amounts of which are indicated in Table 9.

In Comparison Examples 45 through 49, the same operations as those of Examples 65 through 73 were repeated except that no γ-methacryloyloxypropyl trimethoxysilane was used.

The resistances to T-peeling of the composite plates of the above examples and the comparison examples are indicated in Table 9.

Table 9

| Example No. | Modifying Composition | | | | Resistance to T-peeling (kg/cm) |
|---|---|---|---|---|---|
| | Modifying agent | | Organic peroxide | | |
| | Component (1) (part) | Component (2) (part) | Type of Compound | Amount (part) | |
| 65 | 0.5 | 0.5 | A | 0.5 | 7.5 |
| 66 | 2.5 | 0.5 | A | 0.5 | 8.3 |
| 67 | 1.5 | 1.5 | A | 0.5 | 8.2 |
| 68 | 0.5 | 2.5 | A | 0.5 | 8.0 |
| 69 | 2.5 | 2.5 | A | 0.5 | 8.0 |
| 70 | 1.5 | 1.5 | A | 1.0 | 8.2 |
| 71 | 1.5 | 1.5 | B | 0.5 | 7.5 |
| 72 | 2.5 | 0.5 | B | 1.0 | 8.0 |
| 73 | 0.5 | 2.5 | B | 1.0 | 7.6 |
| Comparison Example | | | | | |
| 45 | — | 0.5 | A | 0.25 | 4.5 |
| 46 | — | 1.5 | A | 0.5 | 5.5 |
| 47 | — | 2.5 | A | 0.5 | 5.6 |
| 48 | — | 1.5 | A | 1.0 | 5.0 |
| 49 | — | 1.5 | B | 0.5 | 5.3 |

EXAMPLES 74 THROUGH 76 AND COMPARISON EXAMPLES 50 THROUGH 55

In each of the Examples 74 through 76, 100 parts by weight of the same ethylene-propylene block copolymer as used in Examples 1 through 73 was modified by a modifying composition consisting of 0.5 parts of tert-butyl peroxybenzoate and a modifying agent consisting of γ-methacryloyloxypropyl trimethoxysilane (Component (1)) in an amount as indicated in Table 10 and allyl glycidyl ether (Component (2)) in an amount indicated in Table 10, by the same operations as those of Example 1 except that the temperature of the extruder was set as is indicated in Table 10. The same operations as in Example 1 were repeated using the above-produced modified block copolymer for producing pellets, a bonding film and a composite plate.

In each of Comparison Examples 50 through 52, the same operations as in examples 74 through 76 were carried out except that no allyl glycidyl ether was used. In Comparison Examples 53 through 55, the same procedures as in Examples 74 through 76 were repeated without using γ-methacryloyloxypropyl trimethoxysilane.

The resistances to T-peeling of the composite plates of the above examples and the comparison examples, are indicated in Table 10.

Table 10

| Example No. | Modifying agent | | Temperature of extruder (°C) | Resistance to T-peeling (kg/cm) |
|---|---|---|---|---|
| | Component (1) (part) | Component (2) (part) | | |
| 74 | 1.0 | 1.0 | 180 | 7.9 |
| 75 | 1.0 | 1.0 | 220 | 8.3 |
| 76 | 1.0 | 1.0 | 240 | 7.5 |
| Comparison Example | | | | |
| 50 | 1.0 | — | 180 | 3.3 |

Table 10-continued

| Example No. | Modifying agent Component (1) (part) | Modifying agent Component (2) (part) | Temperature of extruder (°C) | Resistance to T-peeling (kg/cm) |
|---|---|---|---|---|
| 51 | 1.0 | — | 220 | 4.0 |
| 52 | 1.0 | — | 240 | 3.0 |
| 53 | — | 1.0 | 180 | 0.7 |
| 54 | — | 1.0 | 220 | 0.5 |
| 55 | — | 1.0 | 240 | 0.3 |

EXAMPLES 77 THROUGH 79 AND COMPARISON EXAMPLES 56 THROUGH 61

In Examples 77 through 79, the same operations as in Examples 74 through 76 were repeated except that a propylene homopolymer having a melt index of 1.0 and a melting point of 165° C was used instead of the ethylene-propylene block copolymer.

In Comparison Examples 56 through 58, the same procedures as in Examples 77 through 79 were repeated without using allyl glycidyl ether.

In Comparison Examples 59 through 61, the same procedures as in Examples 77 through 79 were repeated without using γ-methacryloyloxypropyl trimethoxysilane.

The resistances to T-peeling of the composite plates of the above examples and the comparison examples are indicated in Table 11.

Table 11

| Example No. | Modifying agent Component (1) (part) | Modifying agent Component (2) (part) | Temperature of extruder (°C) | Resistance to T-peeling (kg/cm) |
|---|---|---|---|---|
| 77 | 1.0 | 1.0 | 180 | 5.5 |
| 78 | 1.0 | 1.0 | 220 | 5.8 |
| 79 | 1.0 | 1.0 | 240 | 5.0 |
| Comparison Example | | | | |
| 56 | 1.0 | — | 180 | 2.8 |
| 57 | 1.0 | — | 220 | 3.0 |
| 58 | 1.0 | — | 240 | 2.5 |
| 59 | — | 1.0 | 180 | 0.1 |
| 60 | — | 1.0 | 220 | 0.3 |
| 61 | — | 1.0 | 240 | 0.1 |

EXAMPLES 80 THROUGH 82 AND COMPARISON EXAMPLES 62 THROUGH 64

In Examples 80 through 82, the same operations as in Examples 74 through 76 were effected except that zinc acrylate was used in place of allyl glycidyl ether.

In Comparison Examples 62 through 64, the same operations as in Examples 80 through 82 were repeated without using γ-methacryloyloxypropyl trimethoxysilane.

The resistances to T-peeling of the composite plates of the above examples and the comparison examples are indicated in Table 12.

Table 12

| Example No. | Modifying agent Component (1) (part) | Modifying agent Component (2) (part) | Temperature of extruder (°C) | Resistance to T-peeling (kg/cm) |
|---|---|---|---|---|
| 80 | 1.0 | 1.0 | 180 | 7.5 |
| 81 | 1.0 | 1.0 | 220 | 8.3 |
| 82 | 1.0 | 1.0 | 240 | 8.0 |
| Comparison Example | | | | |
| 62 | — | 1.0 | 180 | 2.8 |
| 63 | — | 1.0 | 220 | 3.0 |
| 64 | — | 1.0 | 240 | 2.5 |

EXAMPLES 83 THROUGH 85 AND COMPARISON EXAMPLES 65 THROUGH 67

In Examples 83 through 85, the same operations as in Examples 80 through 82 were repeated except that calcium acrylate was employed in place of zinc acrylate.

In Comparison Examples 65 through 67, the same procedures as in Examples 83 through 85 were carried out except that no γ-methacryloyloxypropyl trimethoxysilane was used.

The resistances to T-peeling of the composite plates of the above examples and the comparison examples are indicated in Table 13.

Table 13

| Example No. | Modifying agent Component (1) (part) | Modifying agent Component (2) (part) | Temperature of extruder (°C) | Resistance to T-peeling (kg/cm) |
|---|---|---|---|---|
| 83 | 1.0 | 1.0 | 180 | 6.8 |
| 84 | 1.0 | 1.0 | 220 | 7.2 |
| 85 | 1.0 | 1.0 | 240 | 7.0 |
| Comparison Example | | | | |
| 65 | — | 1.0 | 180 | 0.5 |
| 66 | — | 1.0 | 220 | 1.0 |
| 67 | — | 1.0 | 240 | 0.8 |

EXAMPLES 86 THROUGH 88 AND COMPARISON EXAMPLES 68 THROUGH 70

In Examples 86 through 88, the same procedures as in Examples 80 through 82 were carried out except that aluminum acrylate was used in place of zinc acrylate.

In Comparison Examples 68 through 70, the same operations as in Examples 86 through 88 were repeated except that no γ-methacryloyloxypropyl trimethoxysilane was used.

The resistances to T-peeling of the composite plates of the above examples and the comparison examples are indicated in Table 14.

Table 14

| Example No. | Modifying agent Component (1) (part) | Modifying agent Component (2) (part) | Temperature of extruder (°C) | Resistance to T-peeling (kg/cm) |
|---|---|---|---|---|
| 86 | 1.0 | 1.0 | 180 | 7.9 |
| 87 | 1.0 | 1.0 | 220 | 8.2 |
| 88 | 1.0 | 1.0 | 240 | 8.0 |
| Comparison example | | | | |
| 68 | — | 1.0 | 180 | 3.0 |
| 69 | — | 1.0 | 220 | 3.3 |
| 70 | — | 1.0 | 240 | 3.9 |

EXAMPLES 89 THROUGH 91 AND COMPARISON EXAMPLES 71 THROUGH 73

In Examples 89 through 91, the same operations as in Examples 77 through 79 were carried out except that zinc acrylate ws used in place of allyl glycidyl ether.

In Comparison Examples 71 through 73, the same procedures in Examples 89 through 91 were repeated except that no γ-methacryloyloxypropyl trimethoxysilane was used.

The resistances to T-peeling of the composite plates of the above examples and the comparison examples are indicated in Table 15.

Table 15

| No. | Modifying agent Component (1) (part) | Component (2) (part) | Temperature of (°C) | Resistance to (kg/cm) |
|---|---|---|---|---|
| 89 | 1.0 | 1.0 | 180 | 4.2 |
| 90 | 1.0 | 1.0 | 220 | 4.7 |
| 91 | 1.0 | 1.0 | 240 | 5.0 |
| Comparison example | | | | |
| 71 | — | 1.0 | 180 | 2.5 |
| 72 | — | 1.0 | 220 | 3.3 |
| 73 | — | 1.0 | 240 | 2.9 |

EXAMPLES 92 THROUGH 94

In Examples 92 through 94 the same procedures as in Examples 77 through 79 were carried out except that zinc methacrylate was used in place of allyl glycidyl ether.

The resultant composite plates had the resistances to T-peeling indicated in Table 16.

Table 16

| Example No. | Modifying agent Component (1) (part) | Component (2) (part) | Temperature of extruder (°C) | Resistance to T-peeling (kg/cm) |
|---|---|---|---|---|
| 92 | 1.0 | 1.0 | 180 | 4.5 |
| 93 | 1.0 | 1.0 | 220 | 5.1 |
| 94 | 1.0 | 1.0 | 240 | 5.3 |

EXAMPLES 95 THROUGH 97 AND COMPARISON EXAMPLES 74 THROUGH 76

In Examples 95 through 97, the same procedures as in Examples 77 through 79 were carried out except that aluminum acrylate was used in place of allyl glycidyl ether.

In Comparison Examples 74 through 76, the same operations as in Examples 95 through 97 were repeated without using γ-methacryloyloxypropyl trimethoxysilane.

The resultant composite plates of the above examples and comparison examples had resistances to T-peeling as indicated in Table 17.

Table 17

| Example No. | Modifying agent Component (1) (part) | Component (2) (part) | Temperature of extruder (°C) | Resistance to T-peeling (kg/cm) |
|---|---|---|---|---|
| 95 | 1.0 | 1.0 | 180 | 4.3 |
| 96 | 1.0 | 1.0 | 220 | 5.0 |
| 97 | 1.0 | 1.0 | 240 | 5.1 |
| Comparison example | | | | |
| 74 | — | 1.0 | 180 | 2.0 |
| 75 | — | 1.0 | 220 | 2.5 |
| 76 | — | 1.0 | 240 | 2.2 |

EXAMPLES 98 THROUGH 100 AND COMPARISON EXAMPLES 77 THROUGH 79

In Examples 98 through 100, the same procedures as in Examples 74 through 76 were carried out except that triallyloxy-s-triazine was used instead of allyl glycidyl ether.

In Comparison Examples 77 through 79, the same procedures as in Examples 98 through 100 were repeated without using γ-methacryloyloxypropyl trimethoxysilane.

The resultant composite plates of the above examples and comparison Examples had the resistances to T-peeling indicated in Table 18.

Table 18

| Example No. | Modifying agent Component (1) (part) | Component (2) (part) | Temperature of extruder (°C) | Resistance to T-peeling (kg/cm) |
|---|---|---|---|---|
| 98 | 1.0 | 1.0 | 180 | 8.2 |
| 99 | 1.0 | 1.0 | 220 | 8.5 |
| 100 | 1.0 | 1.0 | 240 | 8.0 |
| Comparison example | | | | |
| 77 | — | 1.0 | 180 | 0.5 |
| 78 | — | 1.0 | 220 | 0.1 |
| 79 | — | 1.0 | 240 | 0.1 |

EXAMPLES 101 THROUGH 103 AND COMPARISON EXAMPLES 80 THROUGH 82

In Examples 101 through 103, operations identical to those in Examples 74 through 76 were carried out except that 1,3,5-triacryloyl hexahydro-s-triazine was used in place of allyl glycidyl ether.

In Comparison Examples 80 through 82, the same operation as in Examples 101 through 103 were repeated without using γ-methacryloyloxypropyl trimethoxysilane.

The resultant composite plates of the above examples and comparison examples had the resistances to T-peeling indicated in Table 19.

Table 19

| Example No. | Modifying agent Component (1) (part) | Component (2) (part) | Temperature of extruder (°C) | Resistance to T-peeling (kg/cm) |
|---|---|---|---|---|
| 101 | 1.0 | 1.0 | 180 | 7.9 |
| 102 | 1.0 | 1.0 | 220 | 8.2 |
| 103 | 1.0 | 1.0 | 240 | 7.7 |
| Comparison example | | | | |
| 80 | — | 1.0 | 180 | 0.1 |
| 81 | — | 1.0 | 220 | 0.1 |
| 82 | — | 1.0 | 240 | 0.1 |

EXAMPLES 104 THROUGH 106 AND COMPARISON EXAMPLES 83 THROUGH 85

In Examples 104 through 106, procedures identical to those in Examples 77 through 79 were carried out except that triallyloxy-s-triazine was employed in place of allyl glycidyl ether.

In Comparison Examples 83 through 85, the same operations as in Examples 104 through 106 were repeated except that no γ-methacryloyloxypropyl trimethoxysilane was used.

The resultant composite plates of the above examples and comparison examples had resistances to T-peeling as indicated in Table 20.

Table 20

| Example No. | Modifying agent Component (1) (part) | Component (2) (part) | Temperature of extruder (° C) | Resistance to T-peeling (kg/cm) |
|---|---|---|---|---|
| 104 | 1.0 | 1.0 | 180 | 3.9 |
| 105 | 1.0 | 1.0 | 220 | 4.8 |
| 106 | 1.0 | 1.0 | 240 | 4.5 |
| Comparison example | | | | |
| 83 | — | 1.0 | 180 | 0 |
| 84 | — | 1.0 | 220 | 0 |
| 85 | — | 1.0 | 240 | 0 |

EXAMPLES 107 THROUGH 109 AND COMPARISON EXAMPLES 86 THROUGH 88

In Examples 107 through 109, operations identical to those in Examples 77 through 79 were effected except that 1,3,5-triacryloyl hexahydro-s-triazine was used in place of allyl glycidyl ether.

In Comparison Examples 86 through 88, the same procedures as in Examples 107 through 109 were repeated except that γ-methacryloyloxypropyl trimethoxysilane was omitted from the modifying agent.

The resultant composite plates of the above examples and comparison examples had the resistances to T-peeling indicated in Table 21.

Table 21

| Example No. | Modifying agent Component (1) (part) | Component (2) (part) | Temperature of extruder (° C) | Resistance to T-peeling (kg/cm) |
|---|---|---|---|---|
| 107 | 1.0 | 1.0 | 180 | 3.0 |
| 108 | 1.0 | 1.0 | 220 | 3.5 |
| 109 | 1.0 | 1.0 | 240 | 3.3 |
| Comparison example | | | | |
| 86 | — | 1.0 | 180 | 0 |
| 87 | — | 1.0 | 220 | 0 |
| 88 | — | 1.0 | 240 | 0 |

EXAMPLES 110 THROUGH 112 AND COMPARISON EXAMPLES 89 THROUGH 91

In Examples 110 through 112, operations identical to those in Examples 74 through 76 were carried out except that 4-methacryloyloxy-phenol was used in place of allyl glycidyl ether.

In Comparison Examples 89 through 91, the same procedures as in Examples 110 through 112 were repeated except that the modifying agent contained no γ-methacryloyloxypropyl trimethoxysilane.

The resultant composite plates of the above examples and comparison examples had the resistances to T-peeling indicated in Table 22.

Table 22

| Example No. | Modifying agent Component (1) (part) | Component (2) (part) | Temperature of extruder (° C) | Resistance to T-peeling (kg/cm) |
|---|---|---|---|---|
| 110 | 1.0 | 1.0 | 180 | 8.0 |
| 111 | 1.0 | 1.0 | 220 | 8.3 |
| 112 | 1.0 | 1.0 | 240 | 8.0 |
| Comparison example | | | | |
| 89 | — | 1.0 | 180 | 5.5 |
| 90 | — | 1.0 | 220 | 6.0 |
| 91 | — | 1.0 | 240 | 5.8 |

EXAMPLES 113 THROUGH 115 AND COMPARISON EXAMPLES 92 THROUGH 94

In Examples 113 through 115, operations identical to those in Examples 74 through 76 were repeated except that 4-(methacryloyloxymethyl) phenol was used in place of allyl glycidyl ether.

In Comparison Examples 92 through 94, the same procedures as in Examples 113 through 115 were repeated except that the modifying agent included no γ-methacryloyloxypropyl trimethoxysilane.

The resultant composite plates of the above examples and comparison examples had resistances to T-peeling as indicated in Table 23.

Table 23

| Example No. | Modifying agent Component (1) (part) | Component (2) (part) | Temperature of extruder (° C) | Resistance to T-peeling (kg/cm) |
|---|---|---|---|---|
| 113 | 1.0 | 1.0 | 180 | 7.9 |
| 114 | 1.0 | 1.0 | 220 | 8.1 |
| 115 | 1.0 | 1.0 | 240 | 8.0 |
| Comparison example | | | | |
| 92 | — | 1.0 | 180 | 5.2 |
| 93 | — | 1.0 | 220 | 5.5 |
| 94 | — | 1.0 | 240 | 5.6 |

EXAMPLES 116 THROUGH 118 AND COMPARISON EXAMPLES 95 THROUGH 97

In Examples 116 through 118 procedures identical to those in Examples 77 through 79 were carried out except that 4-methacryloyloxy-phenol was used in place of allyl glycidyl ether.

In Comparison Examples 95 through 97, the same operations as in Examples 116 through 118 were repeated except that the modifying agent included no γ-methacryloyloxypropyl trimethoxysilane.

Table 24 indicates resistances to T-peeling of the resultant composite plates of the above examples and comparison examples.

Table 24

| Example No. | Modifying agent Component (1) (part) | Component (2) (part) | Temperature of extruder (° C) | Resistance to T-peeling (kg/cm) |
|---|---|---|---|---|
| 116 | 1.0 | 1.0 | 180 | 6.0 |
| 117 | 1.0 | 1.0 | 220 | 6.5 |
| 118 | 1.0 | 1.0 | 240 | 6.3 |

Table 24-continued

| Example No. | Modifying agent Component (1) (part) | Component (2) (part) | Temperature of extruder (° C) | Resistance to T-peeling (kg/cm) |
|---|---|---|---|---|
| Comparison example | | | | |
| 95 | — | 1.0 | 180 | 4.0 |
| 96 | — | 1.0 | 220 | 4.5 |
| 97 | — | 1.0 | 240 | 4.0 |

EXAMPLES 119 THROUGH 121 AND COMPARISON EXAMPLES 98 THROUGH 100

In Examples 119 through 121, operations identical to those in Examples 77 through 79 were carried out except that 4-(methacryloyloxymethyl) phenol was employed in place of allyl glycidyl ether.

In Comparison Examples 98 through 100, the same procedures as in Examples 119 through 121 were repeated except that no γ-methacryloyloxypropyl trimethoxysilane was present in the modifying agent.

Table 25 indicates the resistances to T-peeling of the resultant composite plates of the above examples and comparison examples.

Table 25

| Example No. | Modifying agent Component (1) (part) | Component (2) (part) | Temperature of extruder (° C) | Resistance to T-peeling (kg/cm) |
|---|---|---|---|---|
| 119 | 1.0 | 1.0 | 180 | 6.2 |
| 120 | 1.0 | 1.0 | 220 | 6.5 |
| 121 | 1.0 | 1.0 | 240 | 6.0 |
| Comparison example | | | | |
| 98 | — | 1.0 | 180 | 3.8 |
| 99 | — | 1.0 | 220 | 4.2 |
| 100 | — | 1.0 | 240 | 4.0 |

COMPARISON EXAMPLES 101 THROUGH 106

In Comparison Examples 101 through 103 operations identical to those in Examples 74 through 76 were carried out using a modifying agent consisting of zinc methacrylate only, the amounts of which are indicated in Table 26. In Comparison Examples 104 through 106, the same operations as in Examples 77 through 79 were carried out using a modified agent consisting of calcium acrylate only, the amount of which is indicated in Table 26. Table 26 also indicates the resistance to T-peeling of the resultant comparison composite plates.

Table 26

| Comparison Example No. | Modifying agent Type of compound | Amount (part) | Temperature to extruder (° C) | Resistance to T-peeling (kg/cm) |
|---|---|---|---|---|
| 101 | | 1.0 | 180 | 2.7 |
| 102 | Zinc methacrylate | 1.0 | 220 | 3.5 |
| 103 | | 1.0 | 240 | 3.0 |
| 104 | | 1.0 | 180 | 0.5 |
| 105 | Calcium acrylate | 1.0 | 220 | 0.8 |
| 106 | | 1.0 | 240 | 0.5 |

COMPARISON EXAMPLES 107 THROUGH 125

In each of the Comparison Examples 107 through 125, 100 parts by weight of the same ethylene-propylene block copolymer as used in Example 1 was mixed, in a dry condition, with 0.5 part by weight of tert-butyl peroxybenzoate and a modifying agent consisting of γ-methacryloyloxypropyl trimethoxysilane (Component (1)) and an ethylenically unsaturated compound (Component (2)) indicated in Table 27, at a temperature of 20° C for 3 minutes. Table 27 also shows the amounts of Components (1) and (2). The mixture was charged into a reaction vessel. The atmospheric air within the reaction vessel was replaced with nitrogen. Thereafter, the mixture was heated to a temperature of 130° C and maintained at that constant temperature for 6 hours to modify the block copolymer and completely decompose the organic peroxide compound. The resultant modified block copolymer was discharged from the reaction vessel and formed into a film having a thickness of 100 μ by the same method as described in Example 1. The film was used to two bond aluminum plates by the same method as used in Example 1. The resultant composite plate of each Comparison Example had a resistance to T-peeling as indicated in Table 27.

Table 27

| Comparison Example No. | Modifying agent Component (1) (part) | Component (2) Type of Compound | Amount (part) | Resistance to T-peeling (kg/cm) |
|---|---|---|---|---|
| 107 | 1.0 | — | — | 2.5 |
| 108 | — | allyl glycidyl ether | 1.0 | 0.1 |
| 109 | 1.0 | | 1.0 | 1.0 |
| 110 | — | zinc | 1.0 | 0.3 |
| 111 | 1.0 | acrylate | 1.0 | 1.3 |
| 112 | — | zinc | 1.0 | 0.3 |
| 113 | 1.0 | methacrylate | 1.0 | 0.9 |
| 114 | — | calcium | 1.0 | 0.1 |
| 115 | 1.0 | acrylate | 1.0 | 1.0 |
| 116 | — | aluminum | 1.0 | 0.2 |
| 117 | 1.0 | acrylate | 1.0 | 1.2 |
| 118 | — | triallyloxy- | 1.0 | 1.0 |
| 119 | 1.0 | s-triazine | 1.0 | 3.0 |
| 120 | — | (*) | 1.0 | 0.8 |
| 121 | 1.0 | | 1.0 | 2.8 |
| 122 | — | (**) | 1.0 | 1.3 |
| 123 | 1.0 | | 1.0 | 2.0 |
| 124 | — | (***) | 1.0 | 0.1 |
| 125 | 1.0 | | 1.0 | 1.5 |

Note:
(*) 1,3,5-troacryloylhexahydro-s-triazine
(**) 4-methacryloyloxyphenol
(***) 4-(methacryloyloxymethyl) phenol The above-described Examples and Comparison Examples clearly indicate that the propylene polymer which has been modified by using the modifying agent consisting of γ-methacryloyl-oxypropyl trimethoxysilane (Component (1)) and the specified ethylenically unsaturated compound (Component (2)) has higher bonding properties than the propylene polymer which has been modified using the modifying agent consisting of either γ-methacryloyloxypropyl trimethoxysilane or one of the specified ethylenically unsaturated compounds. Also, it is obvious that the propylene polymer which has been modified at a temperature lower than its thermal decomposing point but not lower than its melting point by the method of the present invention is superior in bonding properties to that modified at a temperature lower than the melting point.

The modified propylene polymer prepared by the method of the present invention has excellent bonding properties with various materials, for example metallic, paper, resin, glass, slate, plywood, leather and fabric articles. The following Reference Examples illustrate in detail the process of producing composite articles by using the modified propylene polymer bonding material.

REFERENCE EXAMPLES 1 THROUGH 6

In Reference Example 1, a modified propylene polymer film having an average thickness of 100 $\mu$ which had been prepared by the same method as mentioned in Example 1, was inserted between an aluminum plate and an iron plate, having respective thicknesses as shown in Table 28. The composite was preheated to a temperature of 220° C for 3 minutes and then heat-pressed at a temperature of 220° C under a pressure of 10 kg/cm² for 2 minutes. The resultant composite plate had a high resistance to peeling at an angle of 180° as is indicated in Table 28.

In each of Reference Examples 2 through 6, the same operations as in Reference Example 1 were repeated using two plates of the type and thickness indicated in Table 28. the resistances to peeling of the composite plates at our angle of 180° are indicated in Table 28.

Table 28

| Reference Example No. | Material Type | Thickness (mm) | Type | Thickness (mm) | Resistance to peeling at 180 degree angle (kg/cm) |
|---|---|---|---|---|---|
| 1 | Aluminum plate | 0.2 | Iron plate | 1.0 | 8.9 |
| 2 | '' | 0.2 | Polypropylene sheet | 2.0 | 8.9 |
| 3 | '' | 0.2 | Stainless steel plate (SUS 304 2B) | 1.0 | 10.0 |
| 4 | Stainless steel plate (SUS 304 2D) | 0.3 | Iron plate | 1.0 | 17.7 |
| 5 | '' | 0.3 | Polypropylene sheet | 2.0 | 13.4 |
| 6 | '' | 0.3 | Aluminum plate | 1.0 | 17.7 |

REFERENCE EXAMPLES 7 THROUGH 17

In Reference Example 7, the same operations as in Reference Example 1 were carried out using an aluminum plate 0.2 mm thick and an asbestos slate 4 mm thick.

The resultant composite plate was subjected to a test to determine the shearing strength thereof. Said shearing strength was determined in accordance with test method ASTM D-1002, except that the stretching velocity of the composite plate was 1.0 m/minute. The shearing strength of the composite plate of Example 7 was 12 kg/cm². In this connection, it should be noted that in the shearing test, only the asbestos slate in the composite plate was broken while the bonding layer was not.

In each of the Reference Examples 8 through 17, the same operations as in Reference Example 7 were effected by using two plates of the type and thickness indicated in Table 29. The shearing strengths of the composite plates are indicated in Table 29. It should be noted that in the shearing test in Reference Examples 8 through 14, the materials bonded to the metal plates were broken but the bonding layers remained intact, and in the shearing test in Reference Examples 15 through 17, the composite plates were not broken even at a shearing force of 200 kg/cm². Shearing strengths larger than 200 kg/cm² are indicated by ">200".

Table 29

| Reference Example No. | Material Type | Thickness (mm) | Type | Thickness (mm) | Resistance to shearing (kg/cm²) |
|---|---|---|---|---|---|
| 7 | Aluminum plate | 0.2 | Asbestos slate[1] | 4 | 12 |
| 8 | '' | 0.2 | Plywood[2] | 3 | 17 |
| 9 | '' | 0.2 | Artificial leather[3] | 2 | 4 |
| 10 | '' | 0.2 | Cotton fabric | 0.3 | 7 |
| 11 | '' | 0.2 | Particle board[4] | 20 | 8 |
| 12 | Stainless steel plate (SUS 304 2D) | 0.3 | Plywood | 3 | 17 |
| 13 | '' | 0.3 | Natural leather | 2 | 21 |
| 14 | '' | 0.3 | Cotton fabric | 0.3 | 7 |
| 15 | Aluminum plate | 4.0 | Aluminum plate | 4.0 | >200 |
| 16 | '' | 4.0 | Stainless steel plate (SUS 304 2D) | 3.0 | >200 |
| 17 | Stainless steel plate (SUS 304 2D) | 3.0 | '' | 3.0 | >200 |

Note:
[1]Trademark of the asbestos slate is "UBE ASBESTOSCEMENT BOARD" made by Ube Slate Co., Ltd., Japan.
[2]Trademark of the plywood is "GOBAN Type 2" made by Murakami Wood Industry Co., Ltd., Japan.
[3]Trademark of the artificial leather is "KURALINO" made by Kurare, Ltd., Japan.
[4]Trademark of the particle board is "OKURA BOARD" made by Banboard Co., Ltd., Japan.

What we claim is:
1. A method for the preparation of modified propylene polymers usable as bonding material, from a crystalline propylene polymer consisting of random and block copolymers of 2 to 15% by weight of ethylene and a balance of propylene and mixtures of 80% by weight or more of the above-mentioned copolymer and a balance of a high density polyethylene, comprising the steps of: uniformly admixing said crystalline propylene polymer with a modifying composition consisting of at least one organic peroxide, and a modifying agent consisting of γ-methacryloyloxypropyl trimethoxysilane and at least one ethylenically unsaturated organic compound selected from the group consisting of the formulae (I) through (V):

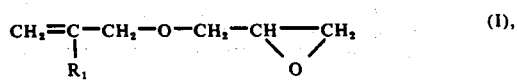

(I),

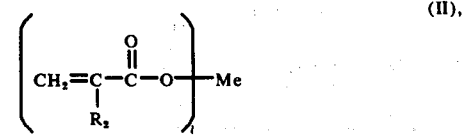

(II),

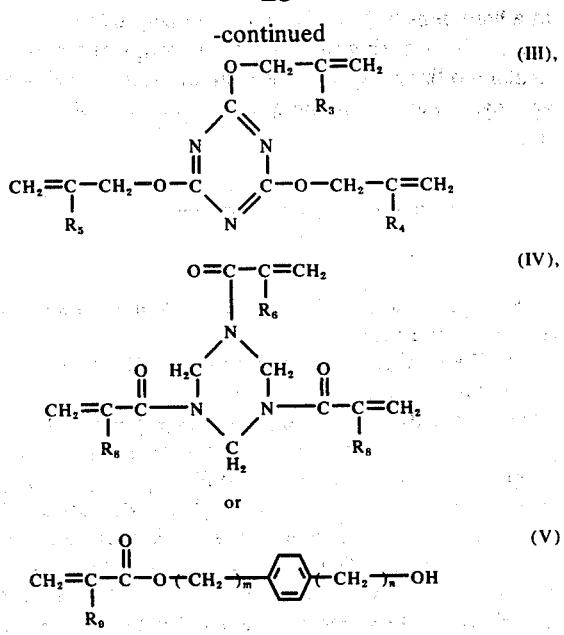

wherein $R_1$ through $R_9$ respectively represent a hydrogen atom or methyl radical, Me represents a metal atom in Groups I, II, III and VIII in the Periodic Table, $l$ represents an integer corresponding to the valence of the metal atom Me, and $m$ and $n$ each represent 0 or 1, and heating the above admixture at a temperature lower than the thermal decomposing point but not lower than the melting point of said crystalline propylene polymer.

2. A method as claimed in claim 1, wherein the mixing ratio by weight of Component (2) to Component (1) is in a range from 0.1:1 to 10:1.

3. A method as claimed in claim 1, wherein said heating temperature is in a range from 180° C to 250° C.

4. A method as claimed in claim 1, wherein said modifying agent is used in an amount of 0.1 to 7.0% based on the weight of said crystalline propylene polymer.

5. A method as claimed in claim 4, wherein the amount of said modifying agent is in a range from 0.5 to 5% based on the weight of said crystalline propylene polymer.

6. A method as claimed in claim 1, wherein said organic peroxide has a one minute half-life temperature of about 160° to about 240° C.

7. A method as claimed in claim 1, wherein said organic peroxide is used in an amount of 0.1 to 5% based on the weight of said crystalline propylene polymer.

8. A method as claimed in claim 7, wherein the amount of said organic peroxide is in a range from 0.25 to 3% based on the weight of said crystalline propylene polymer.

9. A method as claimed in claim 1, wherein said organic peroxide is used in an amount of 5 to 80% based on the weight of said modifying agent.

10. A method as claimed in claim 1, wherein said crystalline propylene polymer is selected from the group consisting of isotactic polypropylene, random and block copolymers of at most 30% by weight of at least one α-olefin other than propylene and a balance of propylene, mixtures of at most 30% by weight of at least one polymer of an α-olefin other than propylene and a balance of isotactic polypropylene and mixtures of two or more of the above-mentioned polymers and mixtures.

11. A method as claimed in claim 10, wherein said olefin other than propylene is either ethylene or butene-1.

12. A method as claimed in claim 1, wherein said organic compound of the formula (I) is either allyl glycidyl ether or 2-methylallyl glycidyl ether.

13. A method as claimed in claim 1, wherein said metal atom Me in the formula (II) is selected from the group consisting of Na, K, Cu, Mg, Ca, Ba, Zn, Al, Fe, Co and Ni.

14. A method as claimed in claim 1, wherein said organic compound of the formula (II) is selected from the group consisting of acrylic and methacrylic salts of Na, Ca, Mg, Zn, Al and Fe (III).

15. A method as claimed in claim 1, wherein said organic compound of the formula (III) is either triallyloxy-s-triazine or tri(2-methylallyloxy)-s-triazine.

16. A method as claimed in claim 1, wherein said organic compound of the formula (IV) is either 1,3,5-triacryloyl hexahydro-s-triazine or 1,3,5-trimethacryloyl hexahydro-s-triazine.

17. A method as claimed in claim 1, wherein said organic compound of the formula (V) is selected from the group consisting of 4-acryloyloxyphenol, 4-(acryloyloxymethyl) phenol, 4-acryloyloxybenzyl alcohol, 4-methacryloyloxyphenol, 4-(methacryloyloxymethyl) phenol, 4-methacryloyloxybenzyl alcohol, and 4-(methacryloykloxymethyl) benzyl alcohol.

18. A method as claimed in claim 1, wherein said organic peroxide is selected from the group consisting of tert-butyl peroxyisopropyl carbonate, di-tert-butyl diperoxylphthalate, tert-butyl peroxyacetate, 2,5-dimethyl-2,5-di(benzolylperoxy) hexene -3, tert-butyl peroxylaurate, tert-butyl peroxymaleic acid, tert-butyl peroxybenzoate, methyl-ethylketone peroxide, dicumyl peroxide, cyclohexanone peroxide, tert-butylcumyl peroxide and mixtures of two or more of the above-mentioned peroxide compounds.

19. A method as claimed in claim 1, wherein said heating is carried out in an extruder.

20. A modified crystalline propylene polymer usable as a bonding material, which comprises a crystalline propylene polymer from a crystalline propylene polymer consisting of random and block copolymers of 2 to 15% by weight of ethylene and a balance of propylene and mixtures of 80% by weight or more of the above mentioned copolymer and a balance of a high density polyethylene, modified with a modifying composition consisting of at least one organic peroxide, and a modifying agent consisting of γ-methacryloyloxypropyl-trimethoxysilane and at least one ethylenically unsaturated organic compound selected from the group consisting of the formulae (I) through (V):

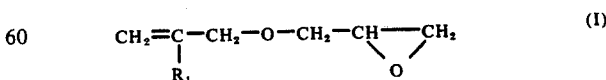

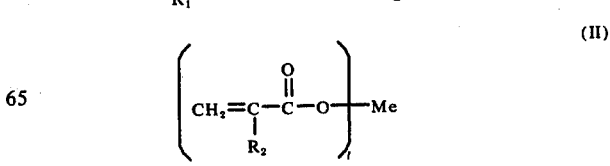

-continued

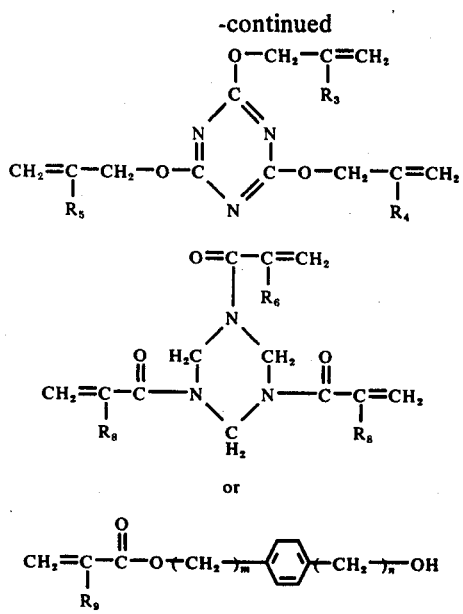
(III), $$O=C-C=CH_2$$
$$|$$
$$R_6$$

(IV), (V)

wherein $R_1$ through $R_9$ respectively represent a hydrogen atom or methyl radical, Me represents a metal atom in Groups I, II, III or VIII in the Periodic Talbe, $\gamma$ represents an integer corresponding to the valence of the metal atom Me, and $m$ and $n$ each represent 0 or 1, said modification being effected at a temperature lower than the thermal decomposing point but not lower than the melting point of said crystalline propylene polymer.

21. A method for the preparation of modified propylene polymers usable as bonding material from a crystalline propylene polymer consisting of random and block copolymers of 2 to 15% by weight of ethylene and a balance of propylene and mixtures of 80% by weight or more of the above mentioned copolymer and a balance of a high density polyethylene, comprising the steps of: uniformly admixing said crystalline propylene polymer with a modifying agent consisting of α-methacryloyloxypropyl trimethoxysilane and a compound of the formula:

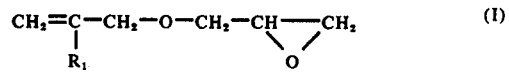
(I)

wherein R is selected from the group consisting of hydrogen and methyl.

22. The method as claimed in claim 21 wherein said compound is allyl glycidyl ether.

23. A modified crystalline propylene polymer usable as a bonding material, which comprises a crystalline propylene polymer from a crystalline propylene polymer consisting of random and block copolymers of 2 to 15% by weight of ethylene and a balance of propylene and mixtures of 80% by weight or more of the above mentioned copolymer and a balance of a high density polyethylene, modified with a modifying composition consisting of at least one organic peroxide, and a modifying agent consisting of α-methacryloyloxypropyltrimethoxysilane and a compound of the formula:

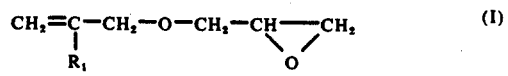
(I)

wherein $R_1$ is selected from the group consisting of hydrogen and methyl.

24. The modified crystalline propylene polymer as claimed in claim 23 wherein said compound is allyl glycidyl ether.

* * * * *